United States Patent
Hariri et al.

(10) Patent No.: US 11,555,305 B2
(45) Date of Patent: Jan. 17, 2023

(54) FOLDABLE SHELTER POD AND METHOD FOR PREPARING A FOLDABLE SHELTER POD

(71) Applicants: Gisue Hariri, New York, NY (US); Mojgan Hariri, New York, NY (US); Richard James Hope Perkin, Barnstaple (GB)

(72) Inventors: Gisue Hariri, New York, NY (US); Mojgan Hariri, New York, NY (US); Richard James Hope Perkin, Barnstaple (GB)

( * ) Notice: Subject to any disclaimer, the term of this patent is extended or adjusted under 35 U.S.C. 154(b) by 61 days.

(21) Appl. No.: 17/357,370

(22) Filed: Jun. 24, 2021

(65) Prior Publication Data
US 2021/0404170 A1 Dec. 30, 2021

Related U.S. Application Data

(60) Provisional application No. 63/043,466, filed on Jun. 24, 2020.

(51) Int. Cl.
*E04B 1/344* (2006.01)
*E04B 1/343* (2006.01)
*E04H 1/12* (2006.01)

(52) U.S. Cl.
CPC ........ *E04B 1/3445* (2013.01); *E04B 1/34336* (2013.01); *E04B 1/34363* (2013.01);
(Continued)

(58) Field of Classification Search
CPC .............. E04B 1/3445; E04B 1/34336; E04B 1/34363; E04B 1/34384; E04B 2001/34389; E04H 1/1205
See application file for complete search history.

(56) References Cited

U.S. PATENT DOCUMENTS

| | | | | |
|---|---|---|---|---|
| 388,424 A | * | 8/1888 | Lindblad | ............... E04B 1/3445 52/70 |
| 421,034 A | * | 2/1890 | Shuck | ................... E04B 1/3445 52/70 |

(Continued)

FOREIGN PATENT DOCUMENTS

| | | |
|---|---|---|
| FR | 8611115 B1 | 11/1994 |
| GB | 6037045 | 6/2018 |
| NL | 1022863 C2 | 9/2004 |

OTHER PUBLICATIONS

Folding Pods for Disaster Relief, announced in YouTube on Apr. 1, 2019 [online], [site visited Mar. 30, 2022], Available from the Internet URL: https://www.youtube.com/watch?v=JHbUaYxDgW4 (Year: 2019).

*Primary Examiner* — Gisele D Ford
(74) *Attorney, Agent, or Firm* — Budzyn IP Law, LLC

(57) ABSTRACT

In one aspect of the invention, a foldable shelter pod is provided herein including: a top; a bottom; first and second foldable end walls; first and second foldable side walls; and, a plurality of mountable corner panels. The walls are each adjustable from an initial flat folded state to a use state where an obtuse angle is internally subtended. In the use state, first, second, third, and fourth corner openings are defined between adjacent pairs of end walls and side walls. The corner panels are mountable in the first, second, third, and fourth corner openings to brace the foldable shelter pod in an erected state.

18 Claims, 17 Drawing Sheets

(52) U.S. Cl.
CPC ....... *E04B 1/34384* (2013.01); *E04H 1/1205* (2013.01); *E04B 2001/34389* (2013.01)

(56) References Cited

U.S. PATENT DOCUMENTS

| | | | |
|---|---|---|---|
| 456,307 A * | 7/1891 | Hodson | E04B 1/3445 52/70 |
| 1,335,456 A | 3/1920 | Nelson | |
| 1,487,583 A | 3/1924 | Andrew | |
| 2,835,931 A | 5/1958 | Albert | |
| 2,846,262 A | 8/1958 | Ray | |
| 2,883,713 A * | 4/1959 | Zug | E04B 1/3445 52/264 |
| 2,955,606 A | 10/1960 | Walker | |
| 2,963,122 A * | 12/1960 | Jagemann | G07F 19/20 D25/16 |
| 3,157,185 A * | 11/1964 | Schoenike | E04H 15/48 D25/1 |
| 3,346,998 A | 10/1967 | Nelson | |
| 3,407,546 A * | 10/1968 | Yates | E04B 1/34384 52/64 |
| 3,445,970 A | 5/1969 | Nelson | |
| 3,527,339 A * | 9/1970 | Cipolla | B65D 7/26 217/14 |
| 3,534,513 A | 10/1970 | Aitken | |
| 3,648,299 A * | 3/1972 | Durst | A61H 33/06 392/394 |
| 3,714,749 A | 2/1973 | Aitken | |
| 3,807,104 A | 4/1974 | Webster | |
| 3,831,337 A | 8/1974 | Johnson | |
| 3,984,949 A * | 10/1976 | Wahlquist | E04B 1/3445 52/143 |
| 4,035,964 A * | 7/1977 | Robinson | E04B 1/3445 217/14 |
| 4,074,475 A * | 2/1978 | Wahlquist | E04B 1/3445 52/143 |
| 4,074,477 A | 2/1978 | Runyon | |
| 4,109,427 A * | 8/1978 | O'Brian | E04H 1/12 119/499 |
| 4,118,901 A | 10/1978 | Johnson | |
| 4,122,638 A * | 10/1978 | O'Brian | E04H 1/12 312/258 |
| 4,133,149 A * | 1/1979 | Angress | E04H 1/1205 D25/4 |
| 4,145,850 A | 3/1979 | Runyon | |
| 4,166,343 A * | 9/1979 | O'Brian | E04B 1/3445 296/173 |
| 4,380,836 A * | 4/1983 | Braxton | E04B 1/3445 D25/16 |
| 4,467,572 A * | 8/1984 | Somers | E04B 1/3445 16/225 |
| 4,527,362 A * | 7/1985 | Tobey | E04B 1/3441 52/646 |
| 4,603,658 A | 8/1986 | Garnsey | |
| 4,742,653 A * | 5/1988 | Napier | E04B 1/3445 52/68 |
| 4,937,987 A | 7/1990 | Runyon | |
| 4,951,432 A | 8/1990 | Wilkinson | |
| 4,989,379 A * | 2/1991 | Suzuki | E04B 1/3445 52/66 |
| 5,107,639 A | 4/1992 | Morin et al. | |
| 5,327,927 A | 7/1994 | Oh | |
| 5,444,944 A * | 8/1995 | Roelofsz | E04B 1/3445 52/79.5 |
| 5,493,818 A | 2/1996 | Wilson | |
| 5,566,514 A | 10/1996 | Freller | |
| 5,660,002 A | 8/1997 | Lashinger | |
| 5,752,470 A | 5/1998 | Koneke | |
| 5,771,639 A | 6/1998 | Wood et al. | |
| 5,950,568 A | 9/1999 | Axelrod et al. | |
| 6,253,498 B1 * | 7/2001 | Fanucci | E04B 1/3445 52/143 |
| 7,025,019 B2 | 4/2006 | Axelrod et al. | |
| 7,347,164 B2 | 3/2008 | Axelrod et al. | |
| 7,540,390 B2 | 6/2009 | Bublitz et al. | |
| 7,552,563 B2 | 6/2009 | Becker | |
| 7,774,919 B2 | 8/2010 | Bublitz et al. | |
| 7,874,107 B1 * | 1/2011 | Medley | E04B 1/3444 52/79.5 |
| 8,235,008 B2 | 8/2012 | Axelrod et al. | |
| 8,613,166 B2 | 12/2013 | Smith | |
| 8,763,315 B2 | 7/2014 | Hartman et al. | |
| 9,416,528 B2 | 8/2016 | Schaffert et al. | |
| 9,441,358 B2 | 9/2016 | Hartman et al. | |
| D820,469 S | 6/2018 | Watson | |
| 10,206,501 B1 * | 2/2019 | Kindred, Jr. | E04B 1/3445 |
| 10,364,587 B2 | 7/2019 | Watson | |
| 11,142,903 B1 * | 10/2021 | Jones, Jr. | E04B 2/7405 |
| 2003/0140573 A1 * | 7/2003 | Marcinkowski | E04B 1/34321 52/79.5 |
| 2004/0031211 A1 * | 2/2004 | Becker | E04B 1/3445 52/79.5 |
| 2005/0044804 A1 * | 3/2005 | Bin | E04B 1/3445 52/79.5 |
| 2005/0076584 A1 | 4/2005 | Loranger | |
| 2006/0248809 A1 * | 11/2006 | Rulquin | E04B 1/3445 52/79.5 |
| 2007/0056977 A1 | 3/2007 | Dobrinski et al. | |
| 2008/0209820 A1 * | 9/2008 | Muir | E04B 1/3445 52/79.5 |
| 2009/0014044 A1 | 1/2009 | Hartman et al. | |
| 2009/0044460 A1 * | 2/2009 | Medley | E04B 1/3444 52/741.1 |
| 2010/0018130 A1 * | 1/2010 | Lopez | E04B 1/3445 16/385 |
| 2011/0290291 A1 * | 12/2011 | Neal | E04H 1/1244 135/144 |
| 2012/0037197 A1 | 2/2012 | Koepke et al. | |
| 2012/0180404 A1 * | 7/2012 | Scouten | E05D 11/00 52/79.5 |
| 2012/0186166 A1 * | 7/2012 | Casto | E04B 1/3445 29/897.3 |
| 2012/0311939 A1 * | 12/2012 | Barragan | E04H 1/1205 52/79.5 |
| 2012/0317898 A1 * | 12/2012 | Strachan | E04B 1/34336 52/79.5 |
| 2013/0139449 A1 * | 6/2013 | Ho | E04H 1/125 52/71 |
| 2013/0192147 A1 * | 8/2013 | Schaffert | E04B 1/3445 52/79.5 |
| 2013/0312799 A1 | 11/2013 | Hotes et al. | |
| 2014/0311052 A1 * | 10/2014 | Farmer | E04B 1/34357 52/79.5 |
| 2015/0101261 A1 * | 4/2015 | Merrifield | E04B 1/34357 52/67 |
| 2015/0218794 A1 * | 8/2015 | Martyn | E04B 1/3444 52/79.5 |
| 2016/0010324 A1 * | 1/2016 | Thrall | E04B 1/34357 52/745.02 |
| 2016/0102740 A1 * | 4/2016 | Martyn | F16H 21/44 74/96 |
| 2016/0138258 A1 | 5/2016 | Schaffert et al. | |
| 2016/0208513 A1 | 7/2016 | Ways | |
| 2016/0265244 A1 * | 9/2016 | Watson | E04B 1/34357 |
| 2017/0051497 A1 * | 2/2017 | Kolbe | E04H 1/1205 |
| 2017/0335561 A1 * | 11/2017 | Wickramasekera | H02S 20/30 |
| 2018/0079589 A1 * | 3/2018 | Meister | B65D 88/129 |
| 2018/0313074 A1 * | 11/2018 | Brown | E04H 15/38 |
| 2019/0257072 A1 * | 8/2019 | Rulquin | E04B 1/3431 |
| 2020/0040599 A1 * | 2/2020 | Laue | E04H 15/20 |
| 2020/0071925 A1 * | 3/2020 | Shum | H02S 20/22 |
| 2020/0215449 A1 * | 7/2020 | Rieber | F16C 11/04 |
| 2022/0127840 A1 * | 4/2022 | Giacomini | E04B 1/34384 |

* cited by examiner

FOLDABLE SHELTER POD AND METHOD FOR PREPARING A FOLDABLE SHELTER POD

CROSS-REFERENCE TO RELATED APPLICATION

This application claims priority to U.S. Provisional Application No. 63/043,466, filed Jun. 24, 2020, the entire contents of which are incorporated by reference herein.

FIELD OF THE INVENTION

The subject invention relates to foldable shelter pods.

BACKGROUND OF THE INVENTION

Natural disasters, such as earthquakes, hurricanes, forest fires, and so forth, may cause significant destruction including the loss of homes. Temporary shelters provide emergency housing for those desperate in need.

Designs are known in the prior art of foldable shelters, which may be transported in a flat state and erected at the place of emergency for use. Examples of such shelters may be found in U.S. Pat. No. 5,107,639 to Morin et al., and U.S. Pat. No. 5,493,818 to Wilson.

U.S. Pat. No. 5,771,639 to Wood et al. shows an emergency shelter which utilizes a tension element to erect the shelter from a flat condition. The tension element is applied externally of the structure and is used to maintain the shelter in the erected condition. Any slackening of the tension element may lead to partial collapsing of the shelter with gaps being formed between adjacent panels.

SUMMARY OF THE INVENTION

In one aspect of the invention, a foldable shelter pod is provided herein including: a top; a bottom; first and second foldable end walls; first and second foldable side walls extending between the first and second foldable end walls; and, a plurality of mountable corner panels. The first foldable end wall, the second foldable end wall, the first foldable side wall, and the second foldable side wall are each adjustable from an initial flat folded state to a use state where an obtuse angle is internally subtended. With the first foldable end wall, the second foldable end wall, the first foldable side wall, and the second foldable side wall being in the use state, a first corner opening is defined between the first foldable end wall and the first foldable side wall, a second corner opening is defined between the first foldable end wall and the second foldable side wall, a third corner opening is defined between the second foldable end wall and the first foldable side wall, and a fourth corner opening is defined between the second foldable end wall and the second foldable side wall. Further, with the first foldable end wall, the second foldable end wall, the first foldable side wall, and the second foldable side wall being in the use state, the corner panels are mountable in the first, second, third, and fourth corner openings to brace the foldable shelter pod in an erected state.

In a further aspect, a method is provided of preparing a shelter pod: providing a shelter pod in a folded state, the shelter pod including a top, a bottom, first foldable end wall, second foldable end wall, first foldable side wall, and second foldable side wall, wherein, the first foldable end wall, the second foldable end wall, the first foldable side wall, and the second foldable side wall are each in an initial flat folded state; and, applying tension between internal portions of the first foldable end wall and the second foldable end wall, causing the first foldable end wall, the second foldable end wall, the first foldable side wall, and the second foldable side wall to be adjusted to an upright state from the initial flat folded state.

These and other features of the subject invention will be better understood through a study of the following detailed description and accompanying drawings.

DETAILED DESCRIPTION OF THE INVENTION

Figure 1:
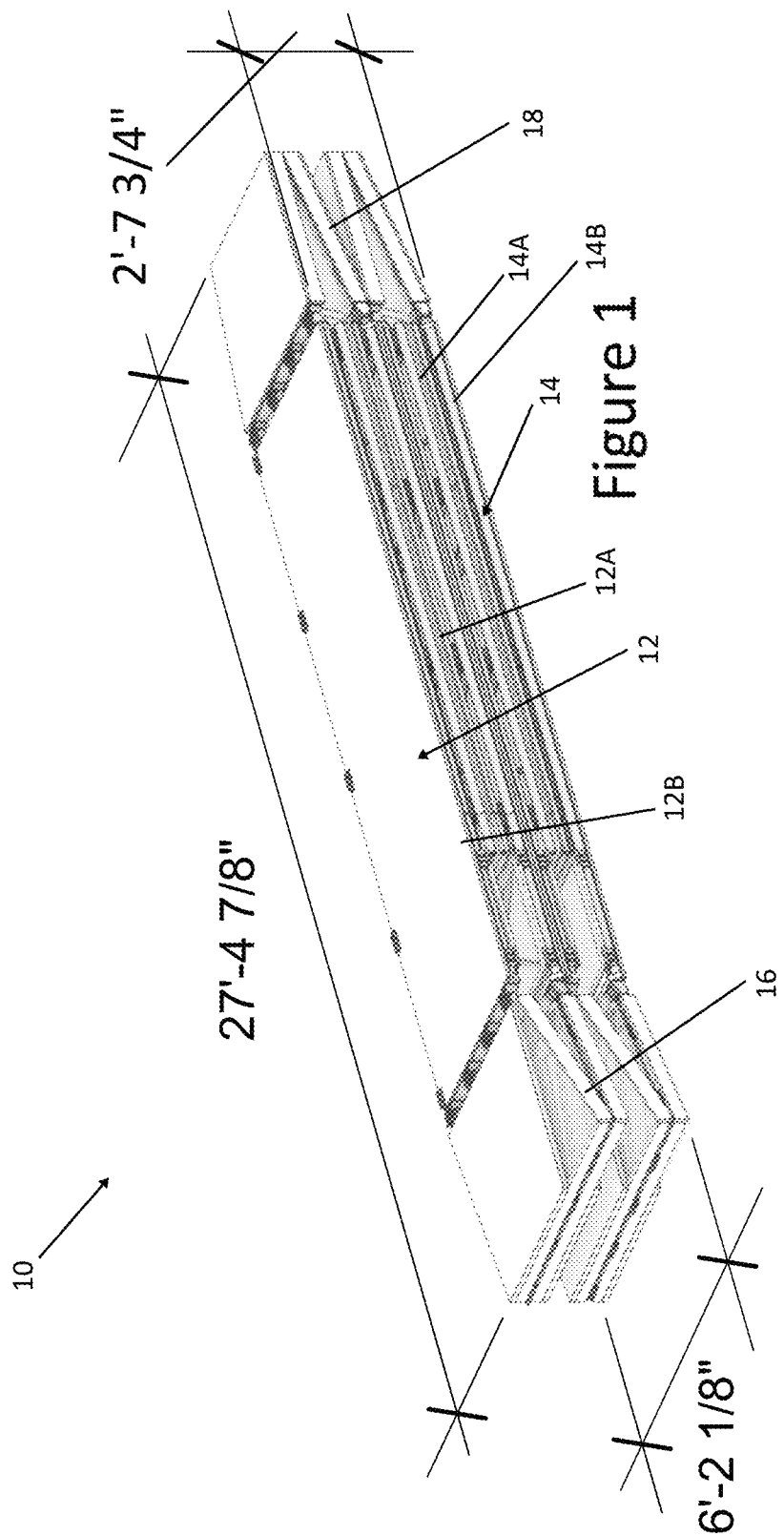
FIG. 1 shows a foldable shelter pod in a possible storage and shipping state in accordance with the subject invention.
Figure 2:
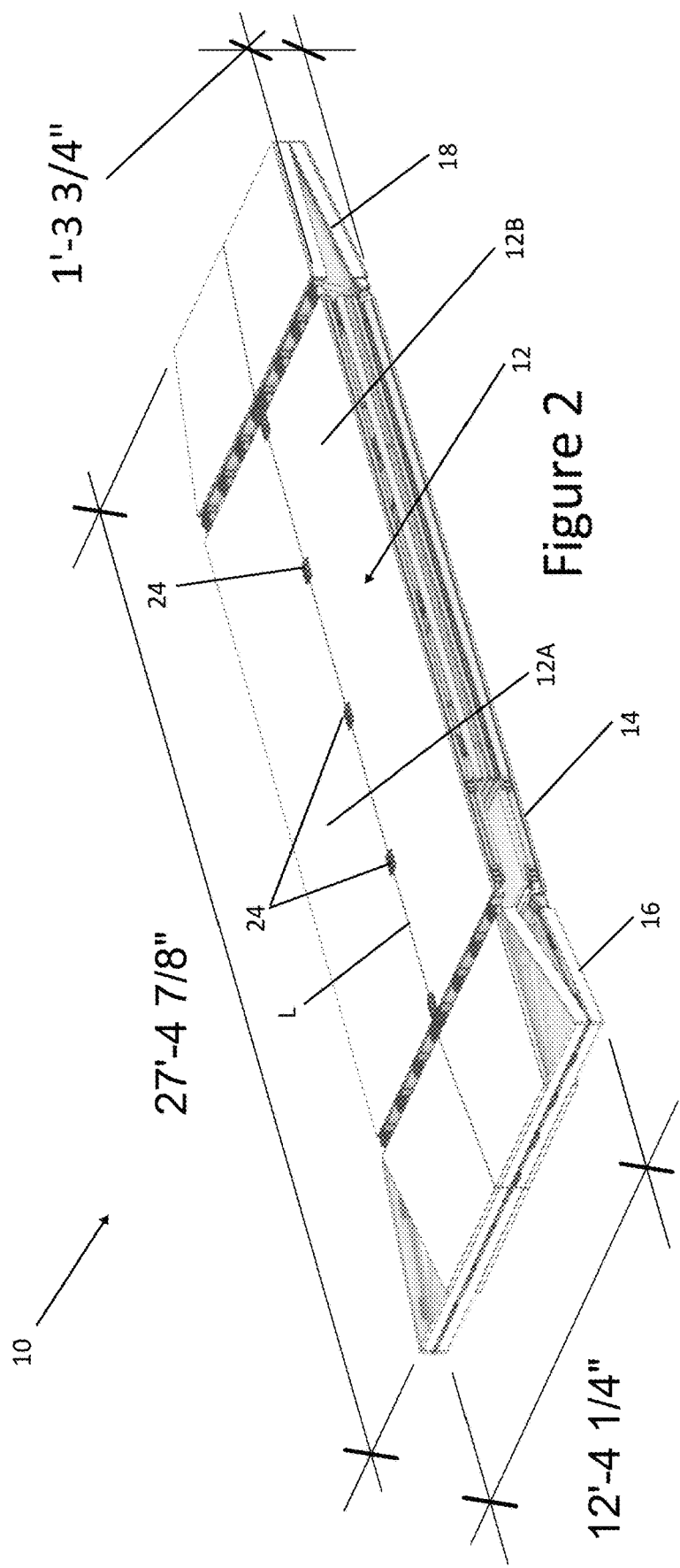
FIGS. 2-6 show erection of a foldable shelter pod in accordance with the subject invention.

As shown in the Figures, a foldable shelter pod is shown and generally designated with the reference number 10. The pod 10 generally includes a top 12, a bottom 14, first foldable end wall 16, second foldable end wall 18, first foldable side wall 20, and second foldable side wall 22. The dimensions (height, length, width) of the pod 10 may be varied to provide different size shelters, as needed.

As shown in the Figures, the first foldable end wall 16 includes upper and lower panels 16A, 16B which are hingedly connected to rotate about a folding axis F which is generally parallel to the bottom 14. Preferably, one or more hinges 24 are provided to define the hinge connection with the hinges 24 being located interiorly of the first foldable end wall 16. Rotation of the upper and lower panels 16A, 16B about the folding axis F allows the first foldable end wall 16 to adjust between a flat state and an upright state.

The second foldable end wall 18 is formed similar to the first foldable end wall 16 with upper and lower panels 18A, 18B which are hingedly connected to rotate about a folding axis F' which is generally parallel to the bottom 14 and to the folding axis F. Preferably, the hinge connection is provided by the hinges 24 being located interiorly of the second foldable end wall 18. Rotation of the upper and lower panels 18A, 18B about the folding axis F' allows the second foldable end wall 18 to adjust between a flat state and an upright state.

The first foldable side wall 20 includes upper and lower panels 20A, 20B which are hingedly connected to rotate about a folding axis F'' which is generally parallel to the bottom 14 and perpendicular to the folding axes F, F'. Preferably, the hinge connection is provided by the hinges 24 being located exteriorly of the first foldable side wall 20. Rotation of the upper and lower panels 20A, 20B about the folding axis F" allows the first foldable side wall 20 to adjust between a flat state and an upright state.

The second foldable side wall 22 is formed similar to the first foldable side wall 20 with upper and lower panels 22A, 22B which are hingedly connected to rotate about a folding axis F'" which is generally parallel to the bottom 14 and parallel to the folding axis F". Preferably, the hinge connection is provided by the hinges 24 being located exteriorly of the second foldable side wall 22. Rotation of the upper and lower panels 22A, 22B about the folding axis F'" allows the second foldable side wall 22 to adjust between a flat state and an upright state.

Figure 3:
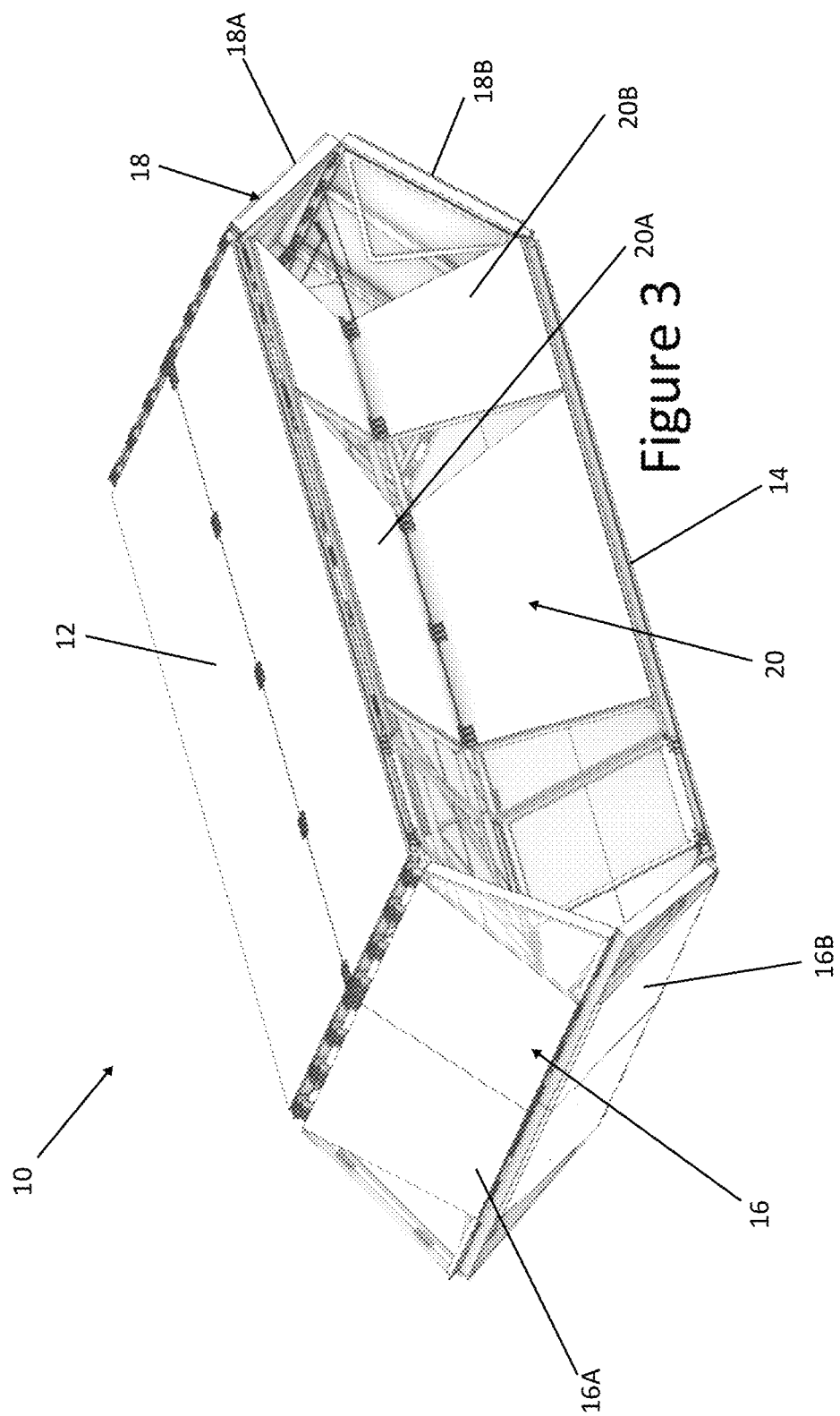
Figure 4:
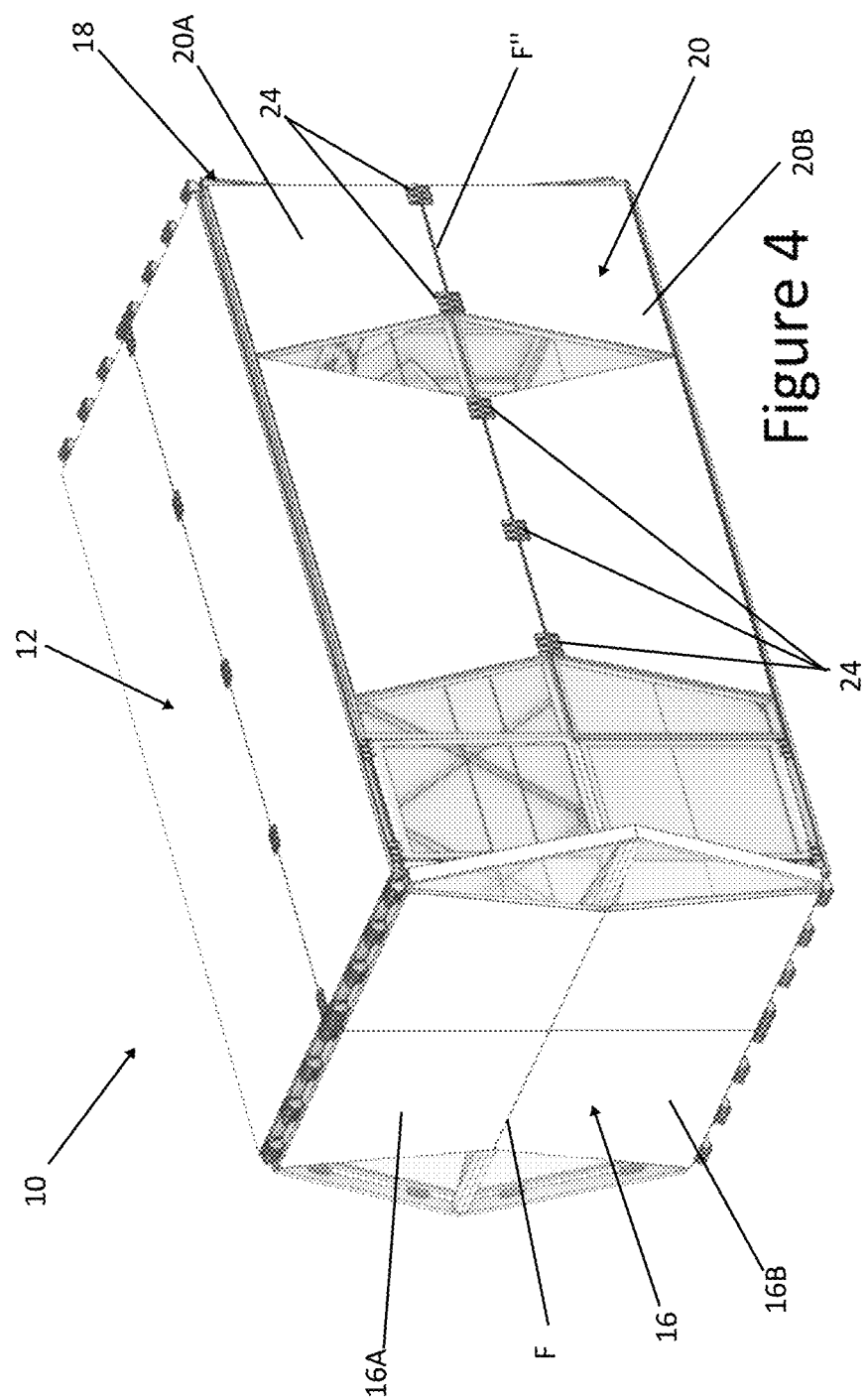

With reference to FIGS. 2-6, the pod 10 may be erected from an initial flat state. The flat state allows for more efficient storage and transportation due to high compaction. As shown in FIGS. 3-4, the pod 10 may be initially erected with inwardly directed force being applied to the first and second foldable end walls 16, 18. By bringing the first and second foldable end walls 16, 18 inwardly, the top 12 is caused to be lifted, moving away from the bottom 14. Inward force is applied to the first and second foldable end walls 16, 18 to allow rotation of the upper and lower panels, 16A, 16B and 18A, 18B about the folding axes F and F', respectively. Upward movement of the top 12 also causes the first and second folding side walls 20, 22 to adjust with the upper and lower panels 20A, 20B and 22A, 22B rotating about the rotation axes F" and F'", respectively.

Figure 5:
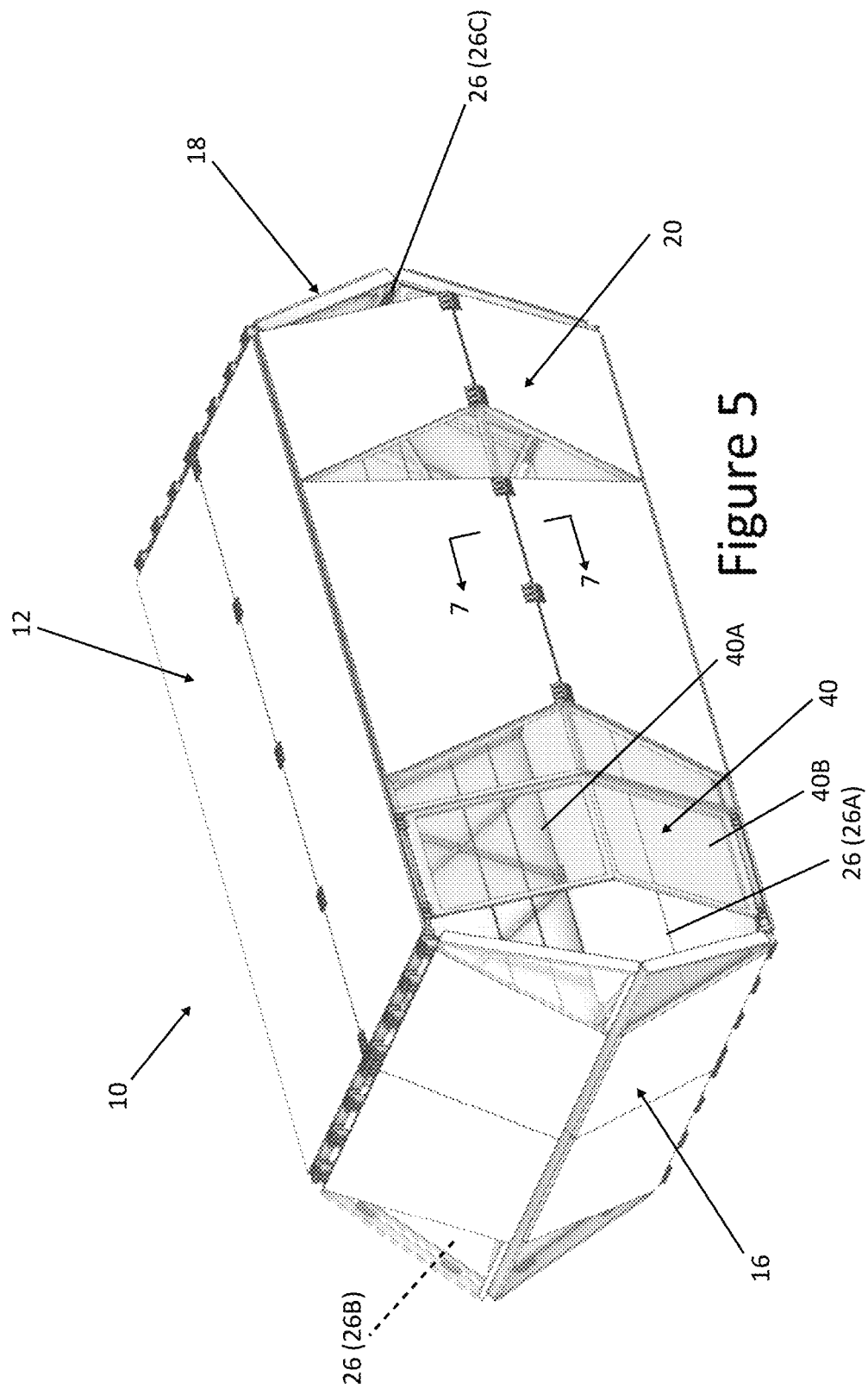
Figure 7:
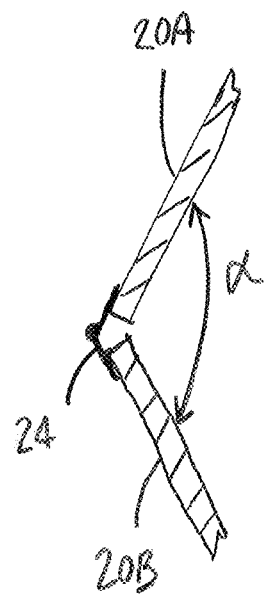
FIG. 7 is a partial cross-sectional view taken along line 7-7 of FIG. 5.

As shown in FIG. 4, the inwardly directed force may be applied till the first and second foldable end walls 16, 18, along with the first and second foldable side walls 20, 22, are generally fully vertical in a fully raised state. Afterwards, the inwardly directed force may be slightly relaxed to allow the first and second foldable end walls 16, 18, and the first and second foldable side walls 20, 22 to bow outwardly about their respective rotation axes F, F', F", F'" to place the pod 10 in a use state, as shown in FIG. 5. In the use state, each of the first and second foldable end walls 16, 18 and the first and second foldable side walls 20, 22 subtends internally an obtuse angle α, as shown in FIG. 7.

Corner openings 26 are defined between adjacent pairs of the walls, particularly with the walls being in a use state. For example, a first corner opening 26A is defined between the first folding end wall 16 and the first folding side wall 20; a second corner opening 26B is defined between the first folding end wall 16 and the second folding side wall 22; a third corner opening 26C is defined between the second folding end wall 18 and the first folding side wall 20; and, a fourth corner opening 26D is defined between the second folding end wall 18 and the second folding side wall 22. The corner openings 26 may be aligned with the profile of an adjacent wall, such as the first corner opening 26A being in line with the profile of the first folding side wall 20. In addition, or alternatively, the corner openings 26 may be out of alignment of the profiles of the adjacent walls, such as the third corner opening 26C being out of alignment with both the second folding end wall 18 and the first folding side wall 20 so as to provide the pod 10 with a truncated corner appearance.

Figure 6:
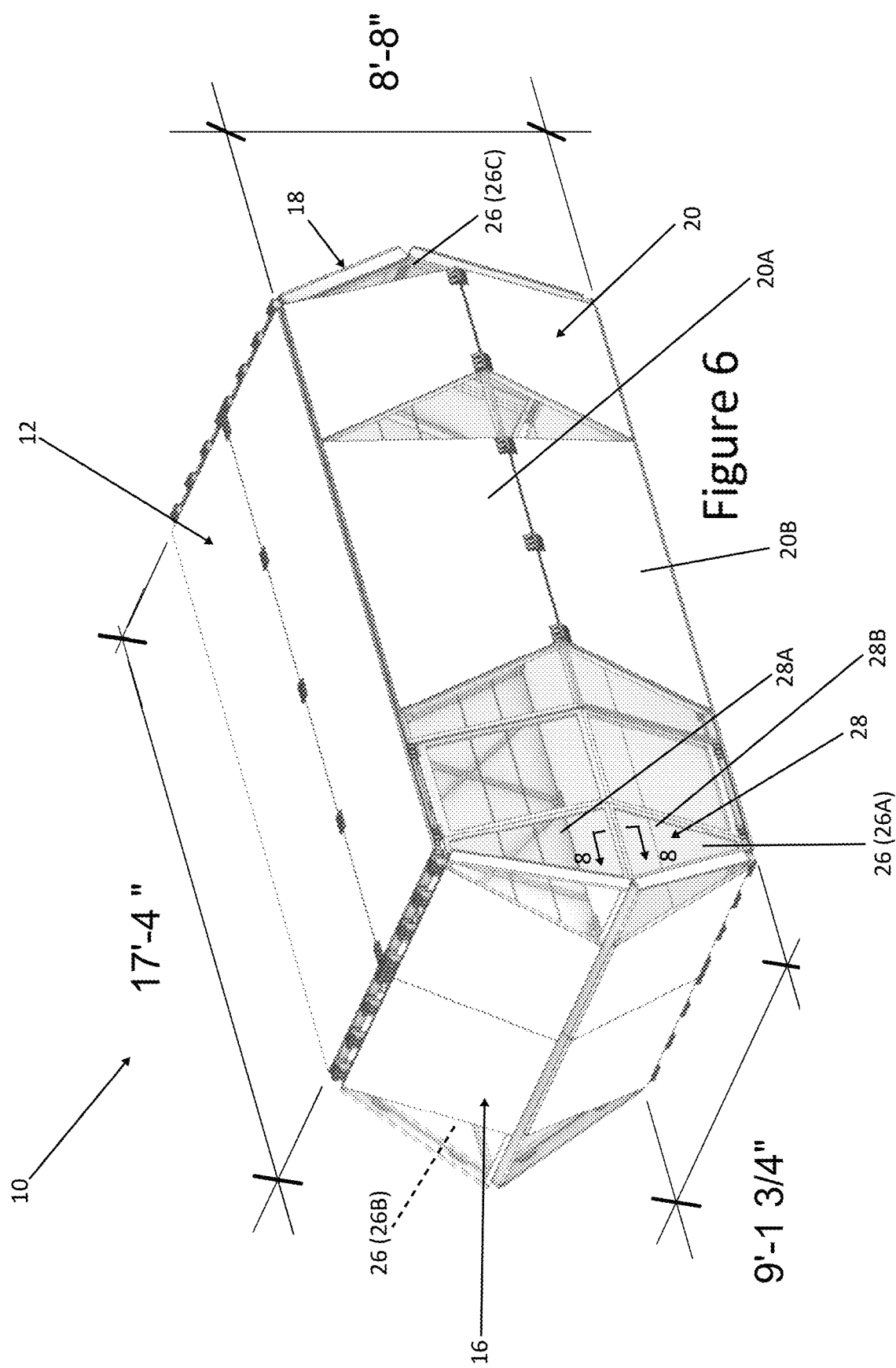

Corner panels 28 are provided for mounting in the corner openings 26. As shown in FIG. 6, with the pod 10 in the use state, the corner panels 30 are mounted in the corner openings 26, which are defined between the walls as discussed above. This braces the pod 10 in supporting the pod 10 in the use state. One or more of the corner panels 28 may be hingedly mounted adjacent to the respective corner opening 26, e.g., hingedly mounted to an adjacent wall, allowing for the respective corner panel 30 to be swung into the respective corner opening 28 for mounting. Alternatively, the corner panels 28 may be separate panels which are mountable into the corner openings 26. The corner panels 28 are formed to generally the same shape as the corresponding corner openings 26. This allows for the corner openings 26 to be generally covered with the corner panels 28 being mounted. Preferably, the corner panels 28 are provided in pairs to be vertically aligned in each of the corner openings 26 so that upper corner panels 28A are each generally coextensive with the upper panels 16A, 18A, 20A, 22A of the adjacent walls 16, 18, 20, 22, and lower corner panel 28B are each generally coextensive with the lower panels 16B, 18B, 20B, 22B of the adjacent walls 16, 18, 20, 22.

Figure 8:
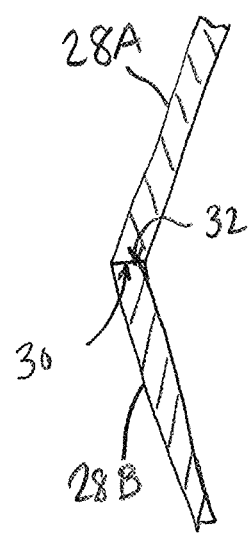
FIG. 8 is a partial cross-sectional view taken along line 8-8 of FIG. 6.

Preferably, the upper corner panels 28A are formed to rest on the lower corner panels 28B in the use state. This allows for weight transfer from the upper corner panels 28A to the lower corner panels 28B in bracing the pod 10. To facilitate such resting, as shown in FIG. 8, lower edges 30 of the upper corner panels 28A may be angled to engage upper edges 32 of the lower corner panels 28B in area contact, preferably in face-to-face area contact, in the use state. In this manner, the upper and lower corner panels 28A, 28B may brace the pod 10 in the use state.

It is preferred that the corner openings 26 each generally have a diamond shape with the upper and lower corner panels 30A, 30B each having a triangular shape, which may be acute, and possibly, isosceles. This provides for improved weight bearing and weight transfer to adjoining portions of the walls.

To allow for a more compact folding of the pod 10, the top 12 and the bottom 14 may be provided to be foldable. Preferably, one of the top 12 and the bottom 14 is provided to be foldable. The top 12 may include top panels 12A, 12B which are hingedly connected to rotate about a folding axis L which is generally parallel to the folding axes F" and F'". Likewise, the bottom 14 may include bottom panels 14A, 14B which are hingedly connected to rotate about a folding axis L' which is generally parallel to the folding axis L. With this arrangement, in a transportation state, the footprint of the pod 10 may be further reduced. The top 12 and the bottom 14 may be folded on site to the initial folding state described above, ready for erection of the pod 10.

Figure 10:
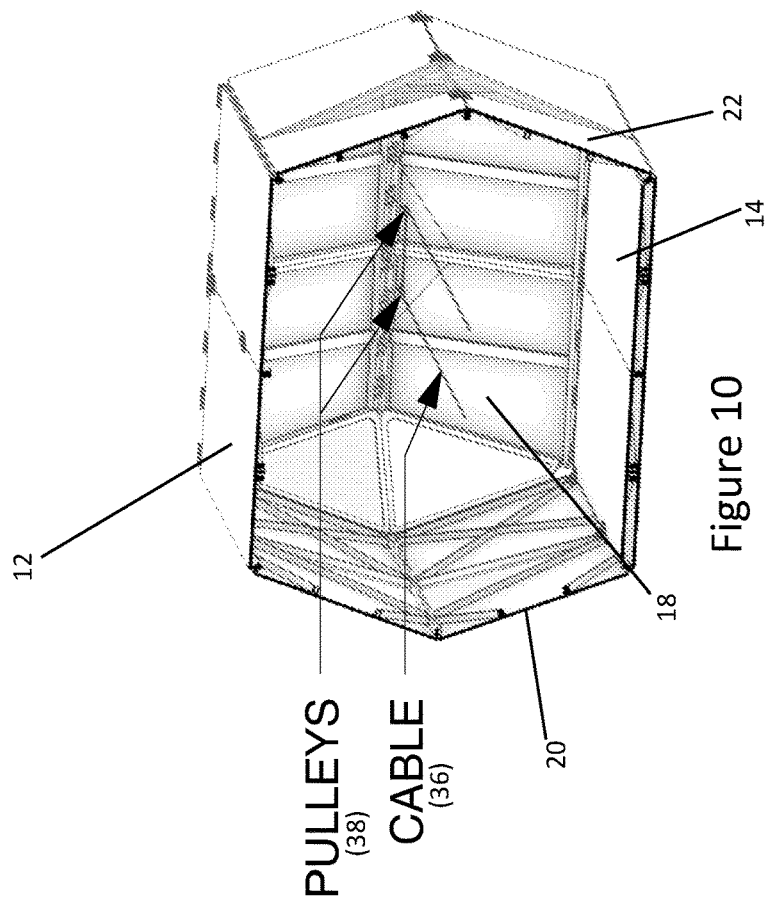
FIGS. 9 and 10 show a motorized winch arrangement useable with the subject invention.
Figure 9:
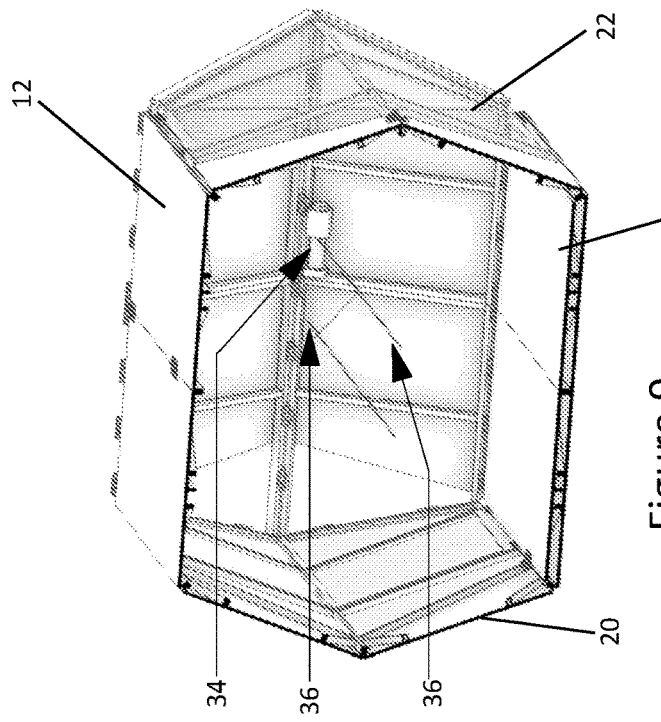
Figure 11:
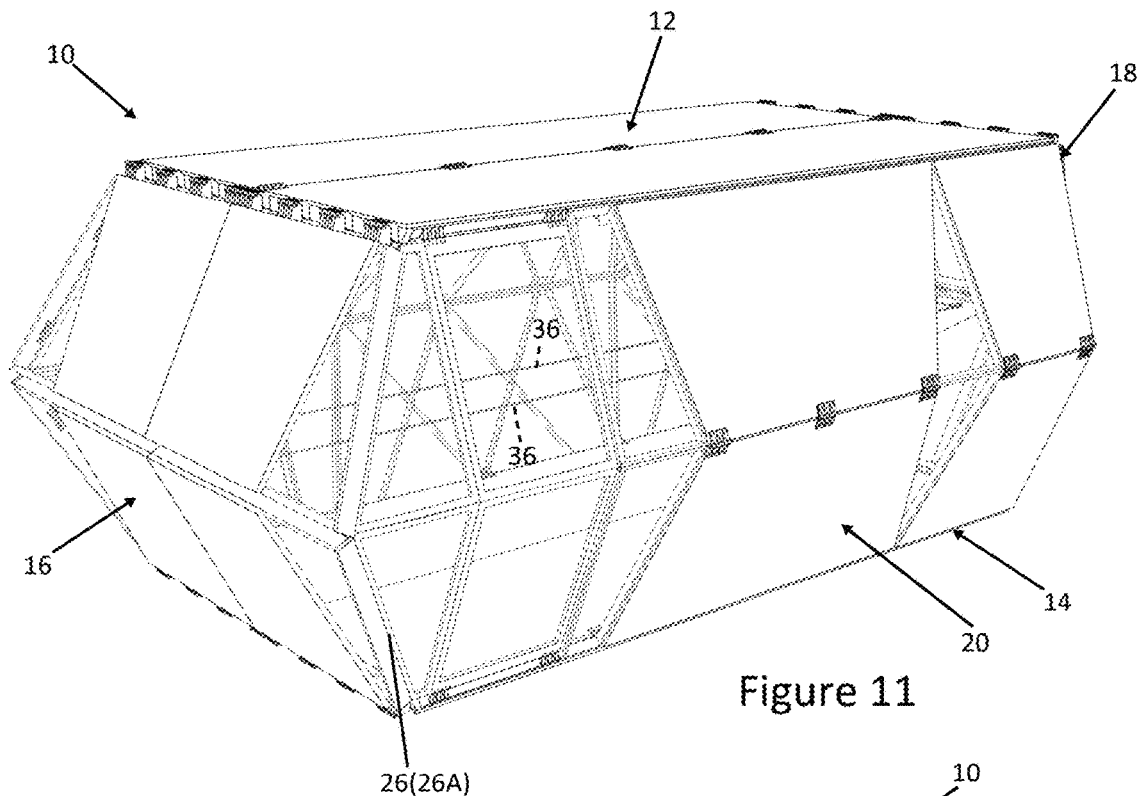
FIGS. 11-17 show a foldable shelter pod in a use state in accordance with the subject invention.
Figure 12:
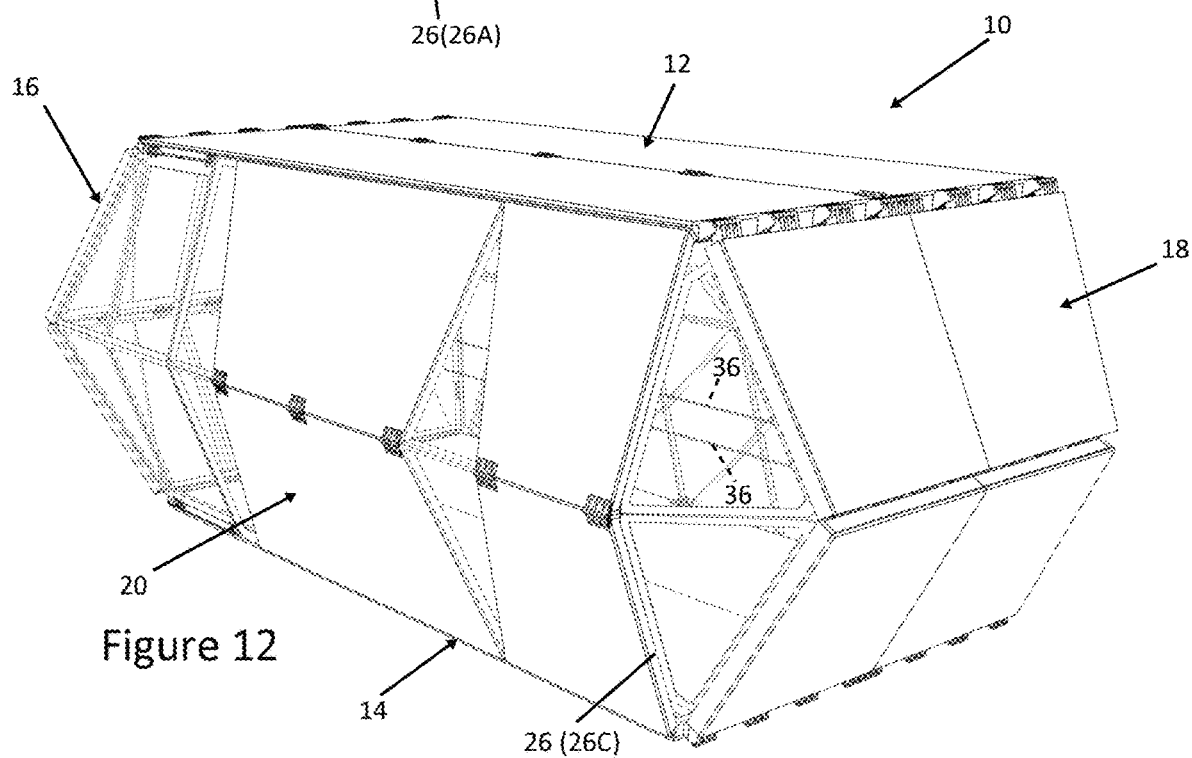
Figure 13:
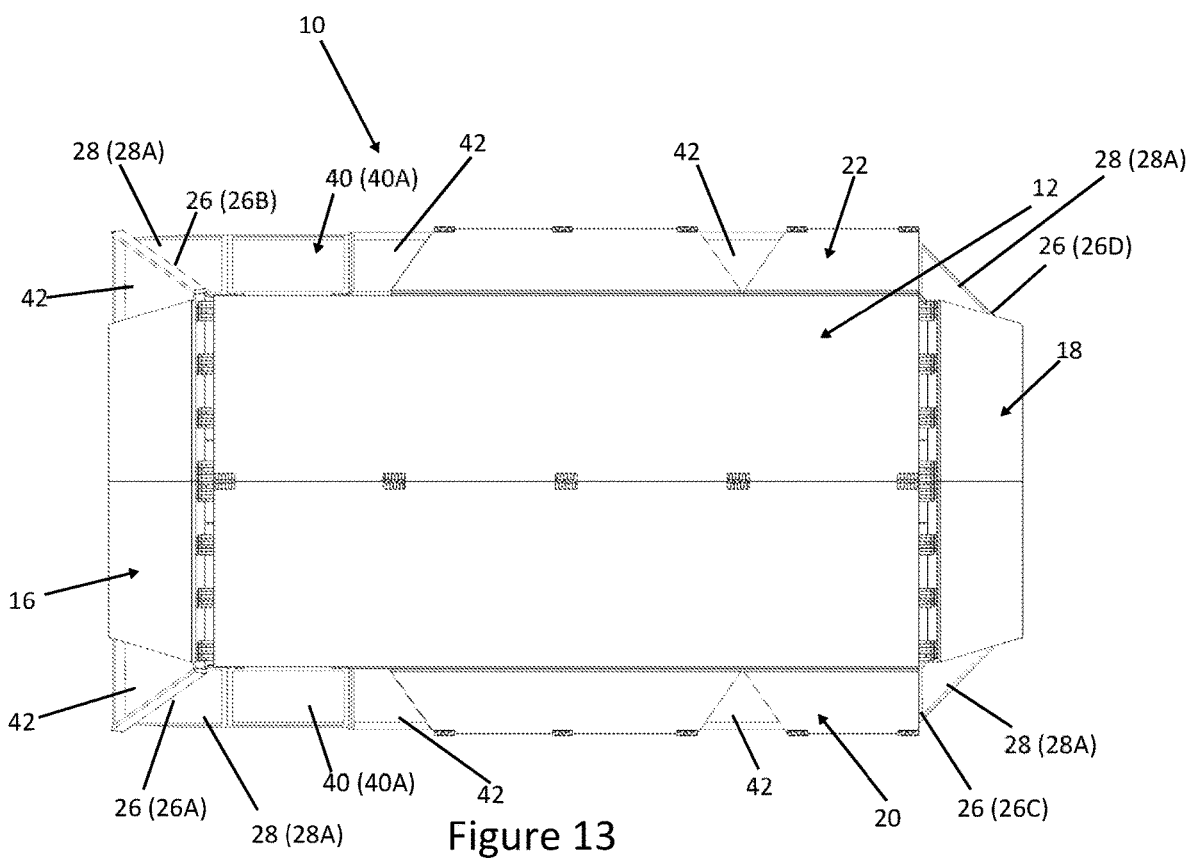
Figure 14:
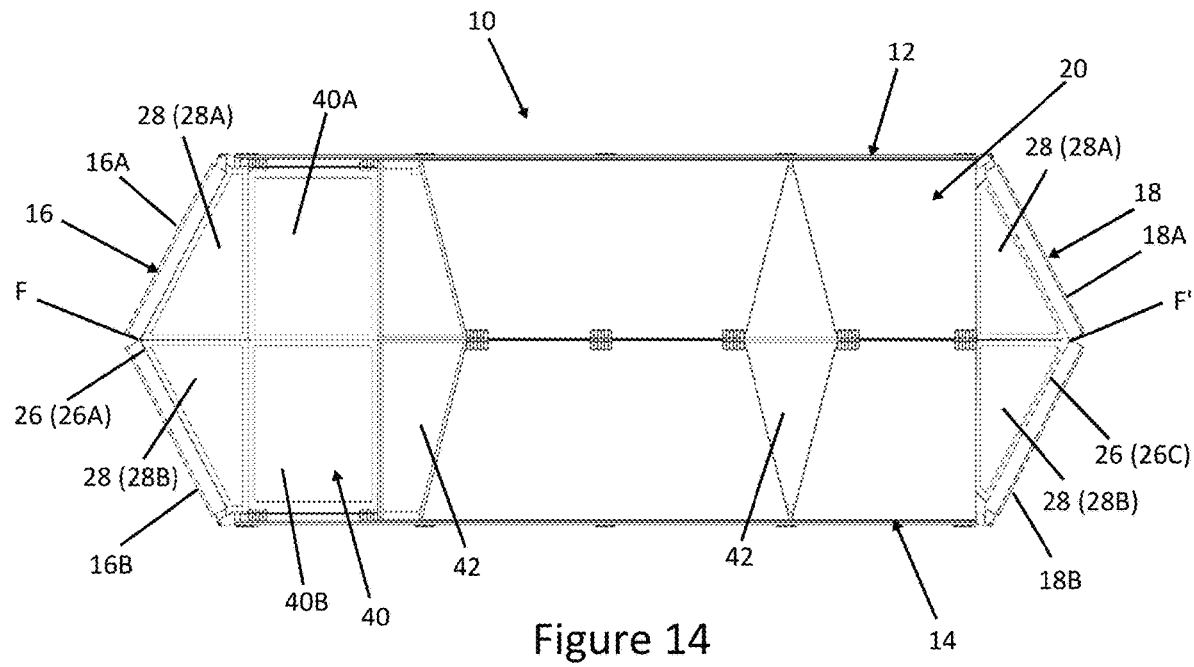
Figure 15:
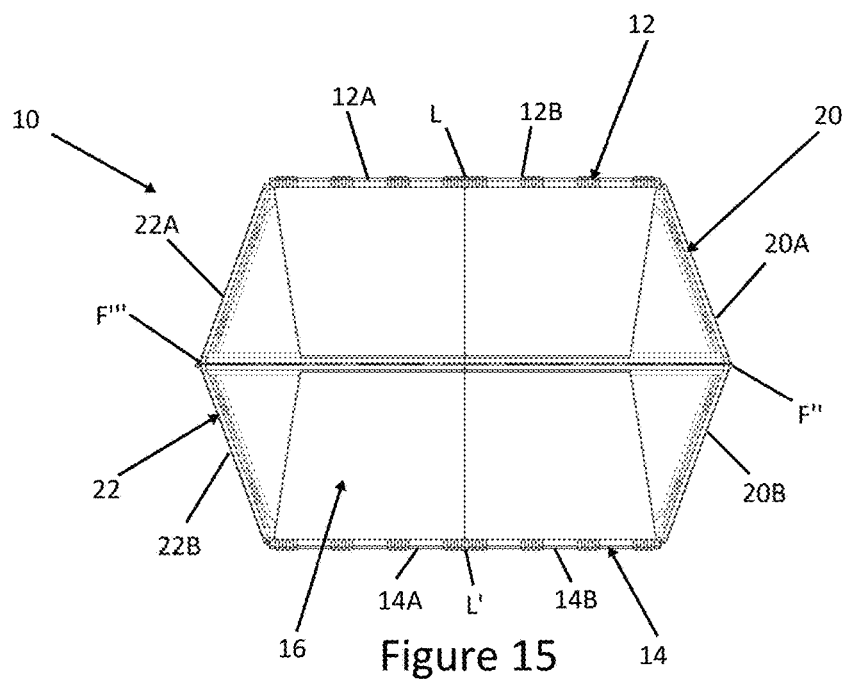
Figure 16:
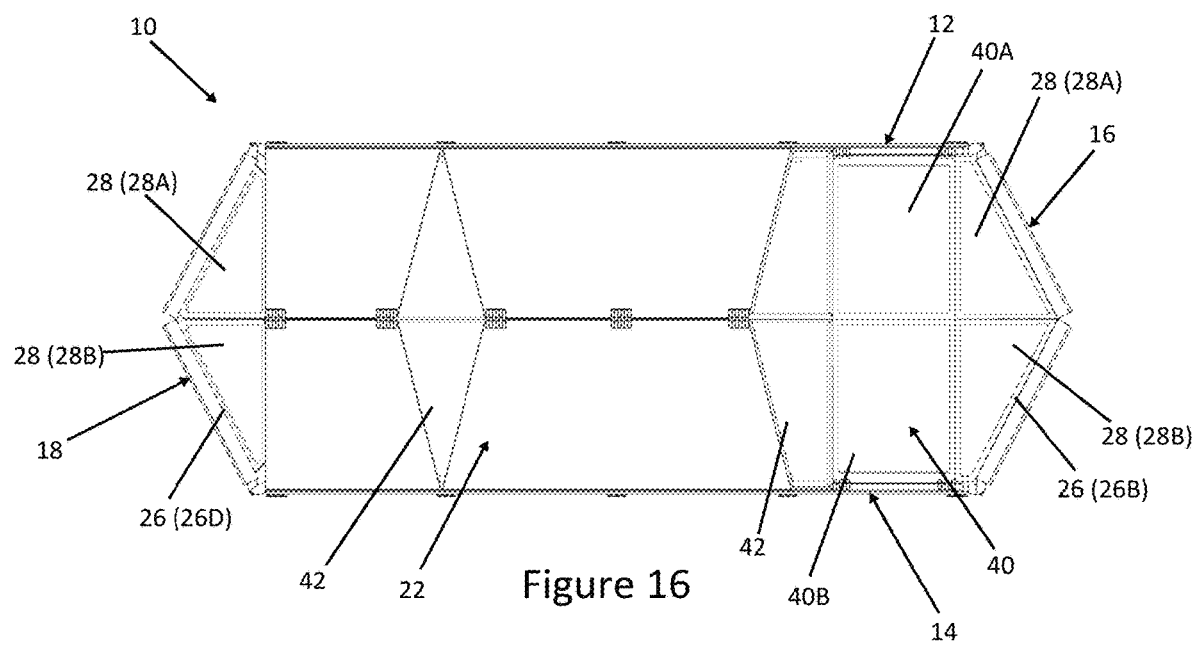
Figure 17:
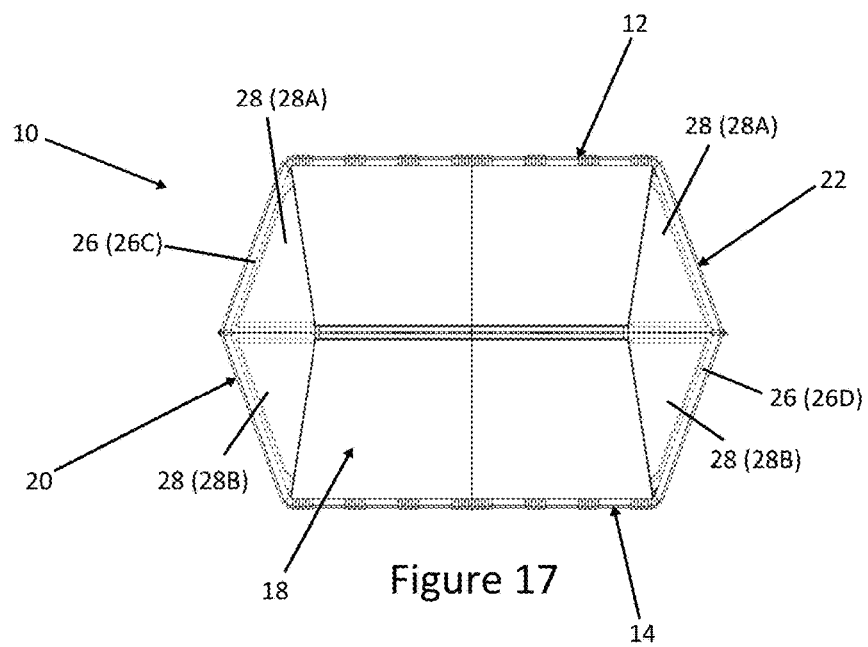

The internally directed force may be provided by mechanical means, such as by at least one motorized winch 34 mounted to one or both of the first and second folding end walls 16, 18. As shown in FIGS. 9 and 10, a tensioning cable 36 is connected to the winch 34 and strung between the first and second folding end walls 16, 18 to transmit a tensioning force therebetween. One or more pulleys 38 may be provided to allow the cable 36 to loop back and connect adjacent to the winch 34. In use, the winch 34 may be actuated (e.g., using remote control) to pull the cable 36 resulting in inwardly directed force acting on the first and second folding end walls 16, 18. The winch 34 may proceed to raise the pod 10 to the fully raised state. The winch 34 may be then be controlled to relax some tension, e.g., by paying out some cable, in allowing the pod 10 to reach its use state. With the corner panels 28 being mounted in the corner openings 26, the winch 34 may fully release tension on the cable 36 allowing for such removal. Alternatively, the winch 34 may be left to maintain tension in the cable 36, providing additional bracing. The winch 34 may be provided with an electrical motor, using battery power. A battery may be electrically connected at the time of use, to avoid maintaining batteries with the pod 10 in storage, not in use. In addition, or alternatively, the winch 34 may be manually powered.

Figure 19:
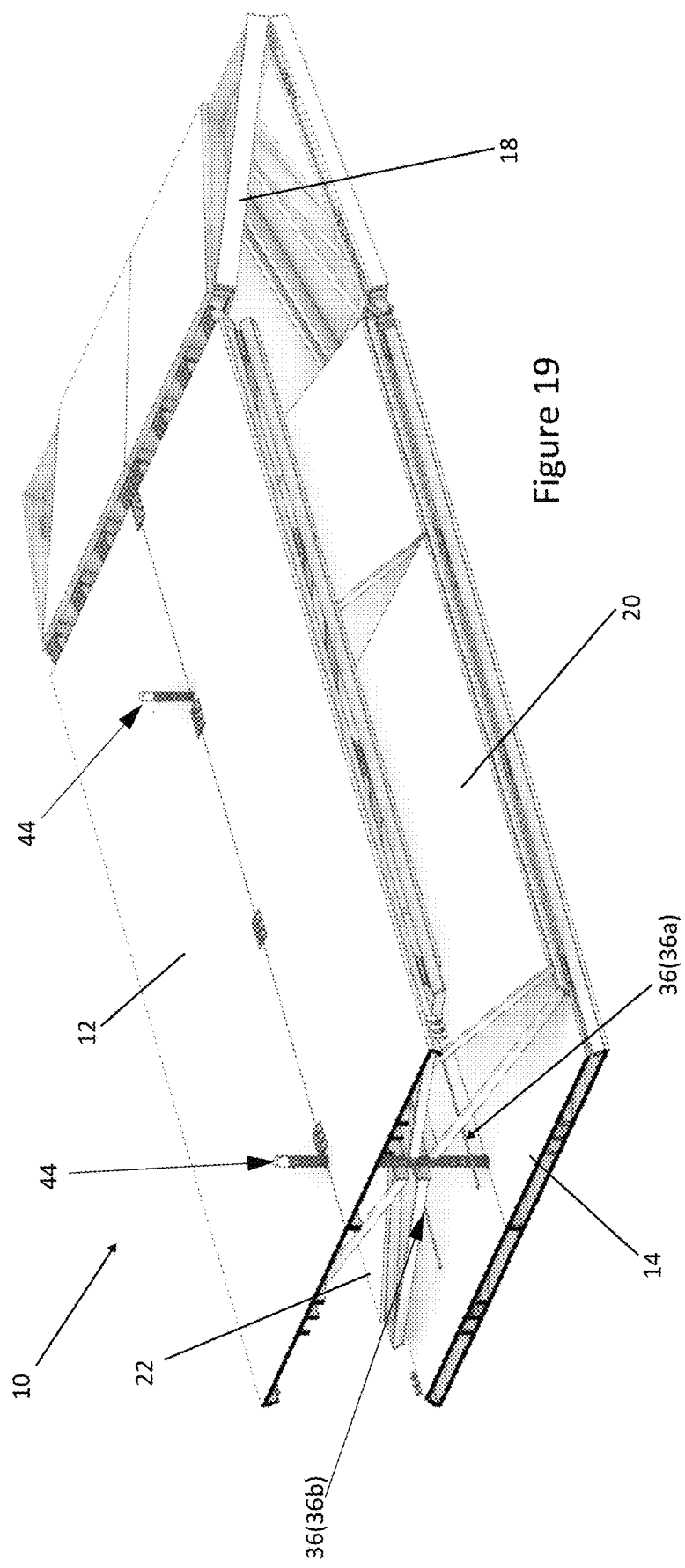
FIGS. 19 and 20 show an arrangement of the tensioning cable useable with the subject invention; and, FIGS. 21 and 22 show power screws useable with the subject invention.
Figure 20:
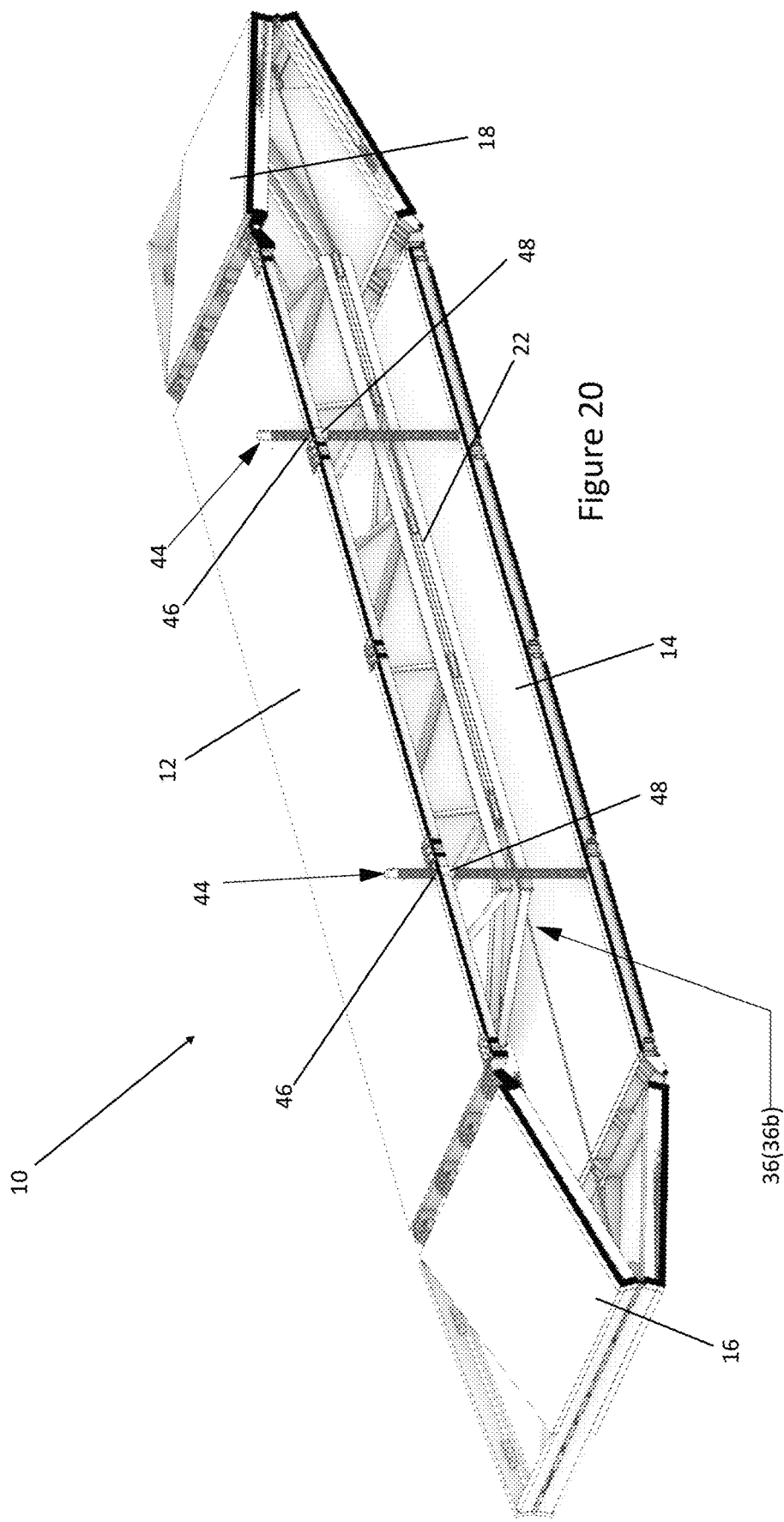

As shown in FIGS. 19 and 20, the tensioning cable 36 may be located to be under the first foldable side wall 20 and/or the second foldable side wall 22 with the pod 10 being in the initial flat state, or slightly erected. In this manner the tensioning cable 36 applies an upward pushing force on portions of the first foldable side wall 20 and/or the second foldable side wall 22 as inwardly directed force is applied to the first and second end walls 16, 18. As the first and second foldable side walls 20, 22 unfold into a vertical state, the tensioning cable 36 becomes clear thereof. In a preferred embodiment, the tensioning cable 36 is located under both the first and second foldable side walls 20, 22, with a first portion 36a of the tensioning cable 36 being located under the first foldable side wall 20 and a second portion 36b of the tensioning cable 36 being located under the second foldable side wall 22, the first and second portions 36a, 36b being joined about one or more of the pulleys 38.

As shown in FIGS. 19-22, one or more power screws 44 may be provided in addition to, or as an alternative to, the winch 34. The power screws 44 may be supported by the bottom 14 to engage the top 12. Preferably, the power screws 44 extend through openings 46 formed in the top 12 to be accessible from outside the pod 10. With the pod 10 in the initial flat state, or slightly erected, drive force may be provided to the power screws 44 from outside the pod 10. The drive force may be applied manually, e.g., with a tool engageable by a user, or applied by motive force, e.g. a motorized or electric drive. The power screws 44 may be each threaded and provided with a complementary threaded nut 48 non-rotatably fixed to the top 12. With rotation of the power screws 44, the nuts 48 are caused to translate along the length of the power screws 44 causing the top 12 to be lifted away from the bottom 14.

Figure 21:
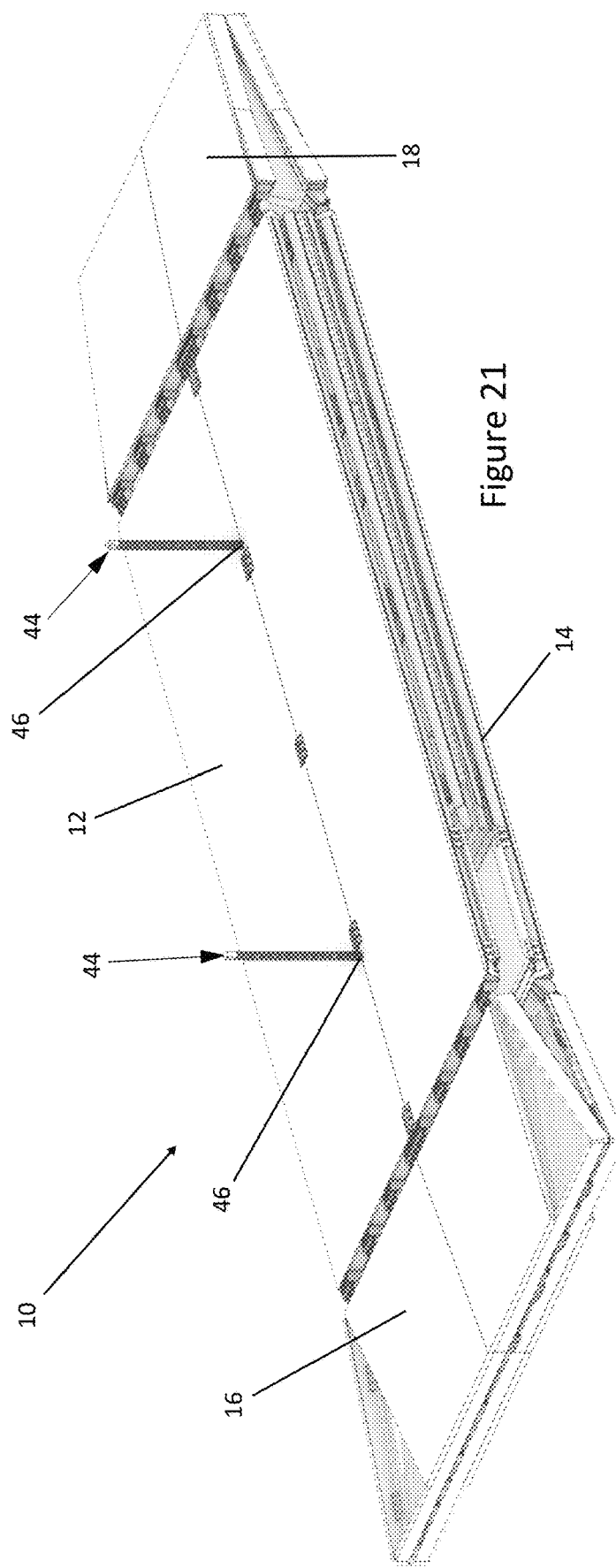
Figure 22:
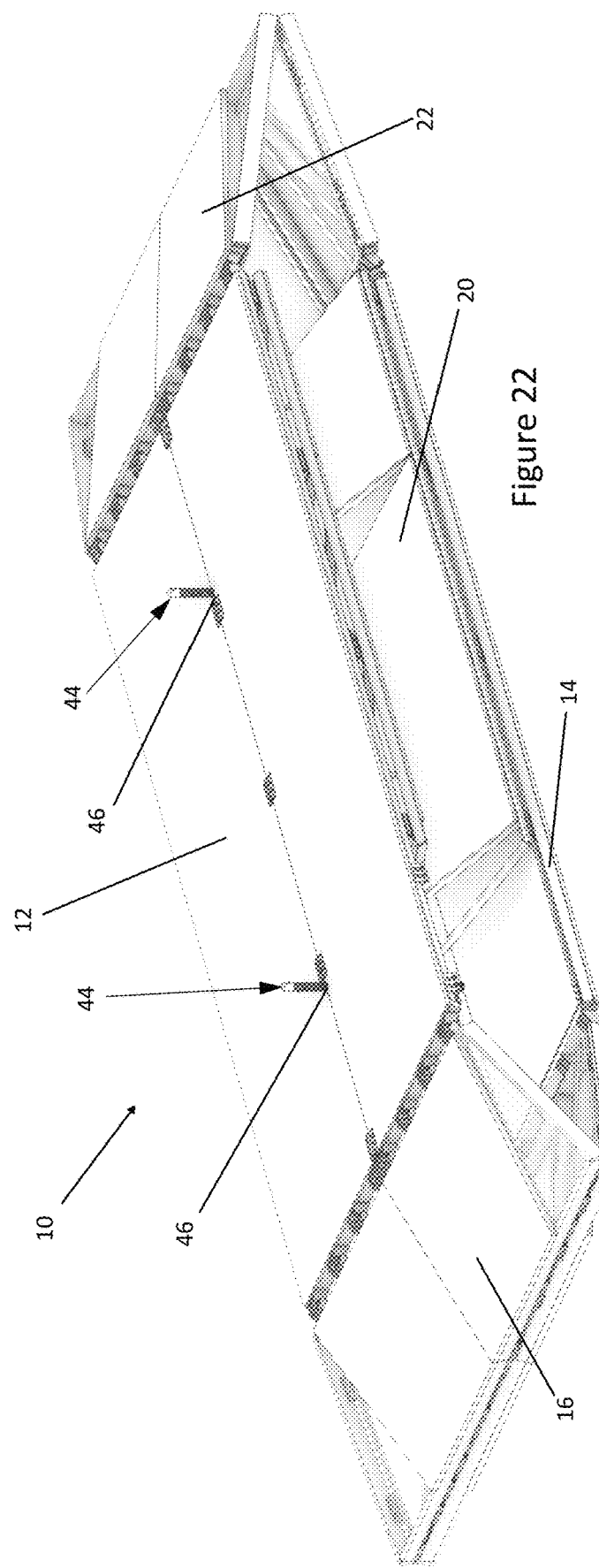

The power screws 44 may be separately provided from the pod 10 for storage and transportation. With the pod 10 in the initial flat state, as shown in FIG. 21, the power screws 44 may be placed through the openings 46, e.g., by threading through the nuts 48, to rest on the bottom 14. With rotation, the power screws 44 may be used to provide initial lift to separate the top 12 from the bottom 14, as shown in FIG. 22. This may be used to assist the winch 34, or in lieu thereof. The greatest force to erect the pod 10 may be needed upon initial unfolding of the pod 10, with the power screws 44 providing such force, or providing supplemental force in addition to the winch 34. Preferably, once the pod 10 is in a partially erected state, the power screws 44 may be removed to avoid remaining in the internal space of the pod 10. This allows for the power screws 44 to each have a length less than the height of the pod 10 in an erected state. This also allows for maximization of the internal space for occupants. If desired, it is possible to size the power screws 44 for full height of the pod 10 in an erected state, thereby allowing the power screws 44 to remain engaged in the openings 46 post-erection.

One or more doors 40 may be formed in any of the walls 16, 18, 20, 22 to allow entry into the pod 10. Preferably, the one or more doors 40 may be located in one or both of the first and second folding side walls 20, 22. The doors 40 may be formed by removable upper and lower door panels 40A, 40B which are removable to provide an open doorway into the pod 10. Preferably, none of the hinges 24 is located between the upper and lower door panels 40A, 40B. Hinges may be provided between the doors 40 and the top 12 or the bottom 14 to allow for maintained connection with the pod 10.

With the pod 10 being intended for use in disaster-struck areas, the pod 10 requires a robust construction. The pod 10 may be formed of any material, or combination of materials, resistant to moisture and strong winds, such as, aluminum, treated wood, stainless steels, polymeric materials and so forth. Moisture resistance may not be as critical for at least certain internal components, with corresponding materials, such as non-treated wood, being utilized. In addition, certain portions of the pod 10 may be made of clear or translucent material to provide natural lighting into the pod 10. For example, the corner panels 28 may be formed of glass or polymer (e.g., polycarbonate, acrylic). The doors 40 may be likewise of glass or polymer. One or more windows 42 may be formed along any of the walls 16, 18, 20, 22.

Figure 18:
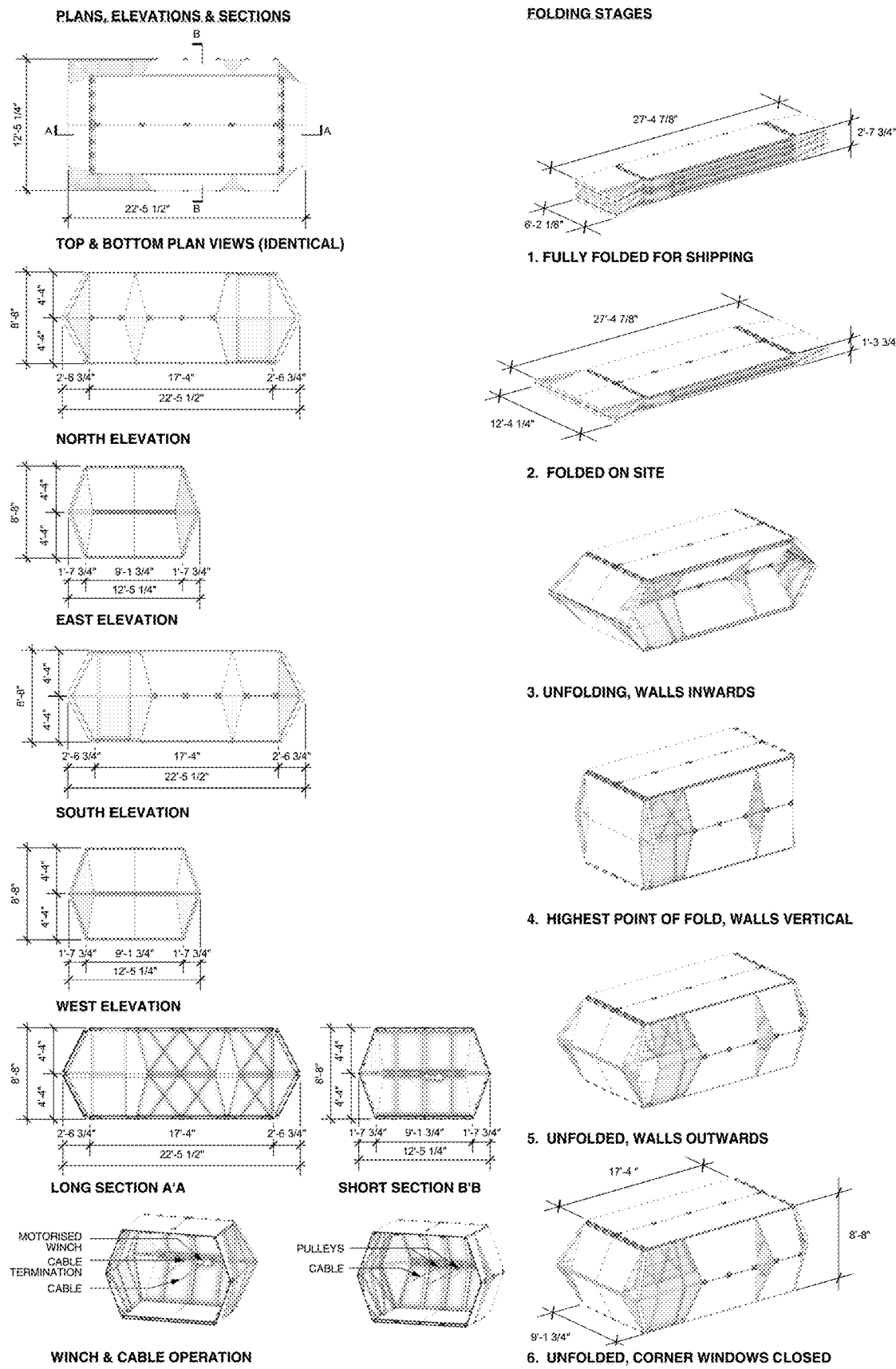
FIG. 18 shows possible dimensioning of a foldable shelter pod in accordance with the subject invention.

FIG. 18 shows possible dimensioning useable with the pod 10. As indicated above, these dimensions may be varied to allow for different applications, i.e., smaller or larger shelters as needed.

What is claimed is:

1. A foldable shelter pod comprising:
   a top;
   a bottom;
   first and second foldable end walls;
   first and second foldable side walls extending between the first and second foldable end walls; and,
   a plurality of mountable corner panels,
   wherein, the first foldable end wall, the second foldable end wall, the first foldable side wall, and the second foldable side wall are each adjustable from an initial flat folded state to a use state where an obtuse angle is internally subtended,
   wherein, with the first foldable end wall, the second foldable end wall, the first foldable side wall, and the second foldable side wall being in the use state, a first corner opening is defined between the first foldable end wall and the first foldable side wall, a second corner opening is defined between the first foldable end wall and the second foldable side wall, a third corner opening is defined between the second foldable end wall and the first foldable side wall, and a fourth corner opening is defined between the second foldable end wall and the second foldable side wall, and,
   wherein, with the first foldable end wall, the second foldable end wall, the first foldable side wall, and the second foldable side wall being in the use state, the corner panels are mountable in the first, second, third, and fourth corner openings to brace the foldable shelter pod in an erected state.

2. The shelter pod of claim 1, wherein the first foldable end wall includes hingedly connected upper and lower panels hingedly connected to rotate about a folding axis, wherein rotation of the upper and lower panels about the rotation axis allows the first foldable end wall to adjust between the flat folded state and the use state.

3. The shelter pod of claim 2, wherein the second foldable end wall includes second upper and lower panels hingedly connected to rotate about a second folding axis, wherein rotation of the second upper and lower panels about the second folding axis allows the second foldable end wall to adjust between the flat folded state and the use state.

4. The shelter pod of claim 3, wherein the second folding axis is parallel to the folding axis.

5. The shelter pod of claim 3, wherein the first foldable side wall includes third upper and lower panels hingedly connected to rotate about a third folding axis, wherein rotation of the third upper and lower panels about the third folding axis allows the first foldable side wall to adjust between the flat folded state and the use state.

6. The shelter pod of claim 5, wherein the third folding axis is perpendicular to the folding axis.

7. The shelter pod of claim 5, wherein the second foldable side wall includes fourth upper and lower panels hingedly connected to rotate about a fourth folding axis, wherein rotation of the fourth upper and lower panels about the fourth folding axis allows the second foldable side walls to adjust between the flat folded state and the use state.

8. The shelter pod of claim 7, wherein the fourth folding axis is parallel to the third folding axis.

9. The shelter pod of claim 8, wherein the fourth folding axis is perpendicular to the folding axis.

10. The shelter pod of claim 1, wherein the first foldable end wall, the second foldable end wall, the first foldable side wall, and the second foldable side wall are adjusted from the flat folded state to the use state with inward force applied to the first foldable end wall and the second foldable end wall.

11. The shelter pod of claim 1, wherein a pair of the corner panels is mountable in the first corner opening vertically aligned so that an upper corner panel rests on a lower corner panel.

12. The shelter pod of claim 11, wherein the first corner opening has a diamond shape, with the upper and lower corner panels each having a triangle shape.

13. The shelter pod of claim 1, wherein the top is foldable.

14. The shelter pod of claim 13, wherein the bottom is foldable.

15. A method of preparing a shelter pod comprising:
providing a shelter pod in a folded state, the shelter pod including a top, a bottom, first foldable end wall, second foldable end wall, first foldable side wall, and second foldable side wall, wherein, the first foldable end wall, the second foldable end wall, the first foldable side wall, and the second foldable side wall are each in an initial flat folded state;
applying tension between internal portions of the first foldable end wall and the second foldable end wall, causing the first foldable end wall, the second foldable end wall, the first foldable side wall, and the second foldable side wall to be adjusted to a use state from the initial flat folded state; and
with the foldable end wall, the second foldable end wall, the first foldable side wall, and the second foldable side wall in the use state, mounting corner panels in corner openings formed between adjacent pairs of the first foldable end wall, the second foldable end wall, the first foldable side wall, and the second foldable side wall.

16. The method as in claim 15, wherein the tension is generated by a tensioning cable strung between the first foldable end wall and the second foldable end wall.

17. The method as in claim 15, further comprising:
applying a lifting force to the top prior to applying the tension between the internal portions of the first foldable end wall and the second foldable end wall.

18. A method of preparing a shelter pod comprising:
providing a shelter pod in a folded state, the shelter pod including a top, a bottom, first foldable end wall, second foldable end wall, first foldable side wall, and second foldable side wall, wherein, the first foldable end wall, the second foldable end wall, the first foldable side wall, and the second foldable side wall are each in an initial flat folded state;
applying a lifting force to the top, causing the first foldable end wall, the second foldable end wall, the first foldable side wall, and the second foldable side wall to be adjusted to a use state from the initial flat folded state; and
with the foldable end wall, the second foldable end wall, the first foldable side wall, and the second foldable side wall in the use state, mounting corner panels in corner openings formed between adjacent pairs of the first foldable end wall, the second foldable end wall, the first foldable side wall, and the second foldable side wall.

* * * * *